United States Patent
Haas et al.

(10) Patent No.: US 9,215,879 B2
(45) Date of Patent: Dec. 22, 2015

(54) APPARATUS FOR PRODUCING PILLOW-SHAPED HOLLOW BODIES

(75) Inventors: Johannes Haas, Vienna (AT); Josef Haas, Leobendorf (AT); Stefan Jiraschek, Koenigsbrunn (AT); Johann Sachsenhofer, Vienna (AT); Josef Hogl, Guntersdorf (AT)

(73) Assignee: Haas Food Equipment GmbH, Vienna (AT)

( * ) Notice: Subject to any disclaimer, the term of this patent is extended or adjusted under 35 U.S.C. 154(b) by 203 days.

(21) Appl. No.: 14/005,971

(22) PCT Filed: May 3, 2012

(86) PCT No.: PCT/EP2012/058138
§ 371 (c)(1),
(2), (4) Date: Sep. 18, 2013

(87) PCT Pub. No.: WO2012/152656
PCT Pub. Date: Nov. 15, 2012

(65) Prior Publication Data
US 2014/0013561 A1    Jan. 16, 2014

(30) Foreign Application Priority Data

May 11, 2011    (AT) .................................. A 670/2011

(51) Int. Cl.
*A21C 15/02*    (2006.01)
(52) U.S. Cl.
CPC ............... *A21C 15/02* (2013.01); *A21C 15/025* (2013.01); *Y10T 29/53996* (2015.01)
(58) Field of Classification Search
CPC . A21C 15/02; A21C 15/025; Y10T 29/53996
USPC .......................................................... 29/283.5
See application file for complete search history.

(56) References Cited

U.S. PATENT DOCUMENTS

| | | | | |
|---|---|---|---|---|
| 2,764,106 A | * | 9/1956 | Maickel | 53/240 |
| 4,084,494 A | * | 4/1978 | Ezaki | 99/450.7 |
| 4,431,396 A | * | 2/1984 | Lee | 425/383 |
| 4,689,236 A | * | 8/1987 | Pinto | 426/502 |
| 4,692,109 A | * | 9/1987 | Hayashi et al. | 425/308 |
| 5,036,756 A | * | 8/1991 | Lindee | 99/450.4 |
| 5,342,188 A | * | 8/1994 | Zimmermann | 425/235 |
| 5,496,165 A | * | 3/1996 | Yamaguchi et al. | 425/289 |

(Continued)

FOREIGN PATENT DOCUMENTS

| WO | 02071848 A1 | 9/2002 |
|---|---|---|
| WO | 2006021373 A1 | 3/2006 |

*Primary Examiner* — Lee D Wilson
*Assistant Examiner* — Marc Carlson
(74) *Attorney, Agent, or Firm* — Laurence Greenberg; Werner Stemer; Ralph Locher

(57) ABSTRACT

An apparatus for producing pillow-shaped hollow bodies which are formed by the division of hot wafer tubes that are plastically deformable in the warm-baked state. In the frame of the device there is provided at least one crimping device which revolves along a circular orbit which is configured as a mechanically actuatable tongs and separates the wafer tubes into pillow-shaped hollow bodies. A horizontally disposed rotatable mounting is provided in the frame of the device which contains the crimping device configured as tongs and moves this along the circular orbit from an upper receiving position provided for receiving the wafer tubes to a lower dispensing position provided for dispensing the pillow-shaped hollow bodies.

9 Claims, 3 Drawing Sheets

(56) References Cited

Figure 2:
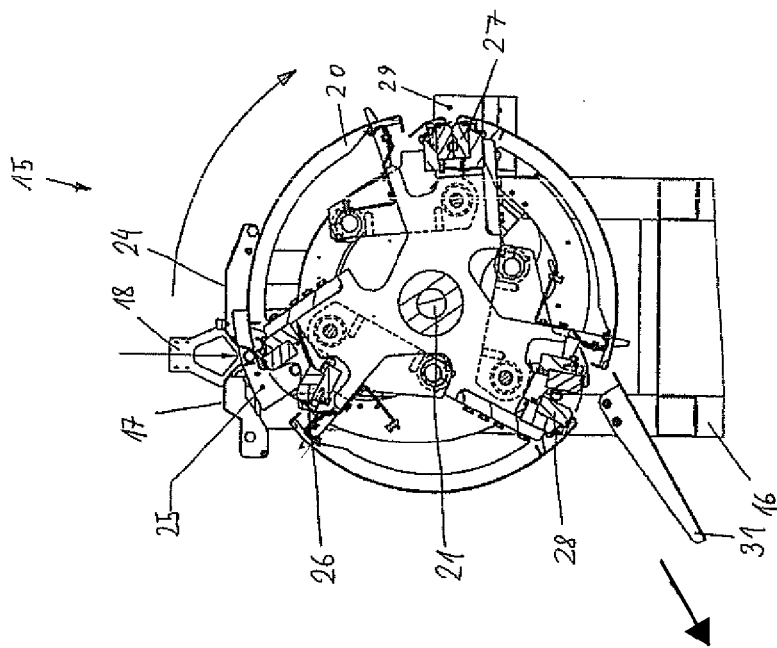

U.S. PATENT DOCUMENTS 5,882,710 A * 3/1999 Jury .............................. 426/512
5,988,047 A * 11/1999 Haas et al. ...................... 99/353
6,254,916 B1 * 7/2001 Haas et al. ..................... 426/523
7,690,102 B2 * 4/2010 Haas et al. ....................... 29/822
2008/0078076 A1 * 4/2008 Haas et al. .................... 29/283.5
2014/0069283 A1 * 3/2014 Haas et al. ...................... 99/427

* cited by examiner

APPARATUS FOR PRODUCING PILLOW-SHAPED HOLLOW BODIES

BACKGROUND OF THE INVENTION

Field of the Invention

The invention relates to an apparatus for producing pillow-shaped hollow bodies which are formed by the separation of hot wafer tubes which are plastically deformable in the warm-baked state and which are delimited at opposite ends by crimped edges, where the apparatus comprises a frame which bears a feeding device for the wafer tubes and contains at least one crimping device in which the wafer tubes are separated into pillow-shaped hollow bodies.

Such an apparatus is known, for example, from WO 2006/021373 (A1). In the known apparatus the wafer tubes are separated into pillow-shaped hollow bodies in crimping devices provided with a carriage which can be moved horizontally to and fro.

BRIEF SUMMARY OF THE INVENTION

It is the object of the invention to improve an apparatus of the type mentioned initially.

The invention proposes a new apparatus for producing pillow-shaped hollow bodies which are formed by the separation of hot wafer tubes which are plastically deformable in the warm-baked state and which are delimited at opposite ends by crimped edges. The new apparatus possesses a frame which bears a feeding device for the wafer tubes and at least one crimping device in which the wafer tubes are separated into pillow-shaped hollow bodies.

The new apparatus is characterized according to the invention in that there is provided at least one crimping device which revolves along a circular orbit in the frame, which moves along the circular orbit from an upper receiving position to a lower delivery position, where the crimping device in the upper receiving position receives a wafer tube and separates the wafer tube on the path to the lower delivery position into pillow-shaped hollow bodies, which are dispensed from the crimping device in the lower delivery position, that a horizontally disposed rotatable mounting is provided below the feeding device, which is rotatable about a horizontal axis of rotation and contains the crimping device and that the crimping device is configured as mechanically actuatable tongs, which has a jaw adjacent to the circumference of the rotatable mounting and can be actuated by a mechanical actuating device.

In the apparatus according to the invention, the crimped edges provided at the opposite ends of the pillow-shaped hollow bodies are produced in a crimping device configured as mechanically actuatable tongs, which revolve along a circular orbit. The tongs are closed after passing the upper receiving position and after receiving a wafer tube. The wafer tube is deformed when closing the tongs. Adjacently disposed pillow-shaped hollow bodies are formed which are interconnected at the lateral edges by the crimped edges. The closed tongs are conveyed by the rotational movement of the horizontally disposed rotatable mounting along the circular orbit from the upper receiving position to the lower delivery position. During the rotational movement of the rotatable mounting, the closed tongs hold the wafer tube fixedly at the crimped edges. This enables long holding times for the formation of the crimped edges. When the closed tongs reach the lower delivery position, the wafer tube is separated at the crimped edges by compressing the tongs. As a result, pillow-shaped hollow bodies which are separate from one another are formed, which upon opening the tongs, fall downwards from the tongs. The tongs are then conveyed by the rotational movement of the rotatable mounting along the circular orbit as far as the upper receiving position in which the next wafer tube is received from the opened tongs.

According to a further feature of the invention, it can be provided that a centering device is provided for the wafer tubes fed horizontally to the device and is attached to the frame in the region of the upper receiving position. This configuration enables the lateral position of each wafer tube to be aligned to the tongs of the crimping device before the wafer tube is received by the opened tongs of the crimping device.

According to a further feature of the invention, it can be provided that there are provided strippers which are assigned to the side surfaces of the revolving crimping device and which are attached to the frame, which are disposed on the circular orbit between the upper receiving position and the lower delivery position. This configuration enables the ends of the wafer tube projecting laterally beyond the tongs after closing the tongs to be scraped from the side surfaces of the tongs before the tongs reach the lower delivery position.

According to a further feature of the invention, it can be provided that a collecting tray is provided for the waste falling out from the revolving crimping device and is disposed in the frame below the rotatable mounting.

According to a further feature of the invention, it can be provided that a diagonally sloping chute which is fastened to the frame and which is located below the lower delivery position is provided for the pillow-shaped hollow bodies falling from the revolving crimping device.

According to a further feature of the invention, it can be provided that in the horizontally disposed rotatable mounting, two or more crimping devices configured as mechanically actuatable tongs, arranged at a distance from one another along the circumference of the rotatable mounting are provided.

According to a further feature of the invention, it can be provided that the crimping device configured as mechanically actuatable tongs has two cheeks which delimit the jaw, of which one cheek is rigidly connected to the rotatable mounting whilst the other cheek is fastened to an actuating lever mounted pivotably in the rotatable mounting, which can be brought into engagement with the mechanical actuating device for opening and closing the tongs.

According to a further feature of the invention, it can be provided that the two tong cheeks have mutually opposite tool strips which are arranged parallel to the axis of rotation of the rotatable mounting, and that the tool strips carry mutually opposite crimping jaws.

According to a further feature of the invention, it can be provided that a drive motor coupled mechanically to the rotatable mounting is provided, and that a mechanical actuating device configured as a cam controller is provided for the tongs of the crimping device, wherein the cam controller has a stationary cam disposed next to the rotatable mounting, on which a control roller attached to the actuating lever of the tongs abuts. This configuration enables a continuous operation of the apparatus according to the invention, where the drive motor produces a continuous rotational movement of the rotatable mounting and the mechanical actuating device configured as a cam controller actuates the revolving tongs disposed in the rotatable mounting.

The invention is explained in detail hereinafter for exemplary embodiment by reference to the drawings.

BRIEF DESCRIPTION OF THE SEVERAL
VIEWS OF THE DRAWING

Figure 1:
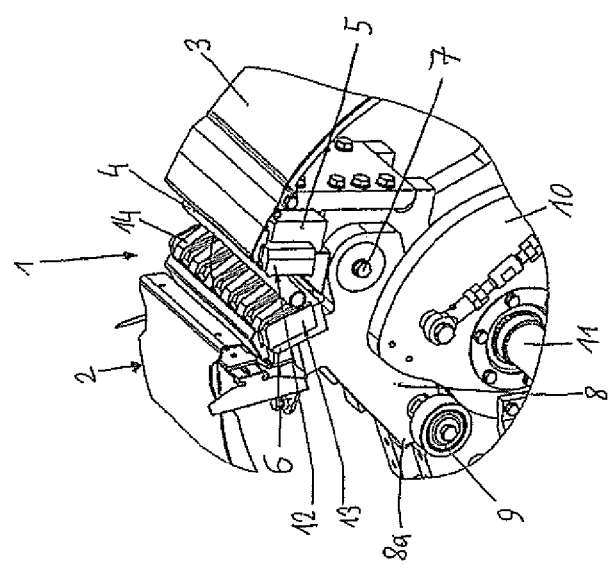
Figure 4:
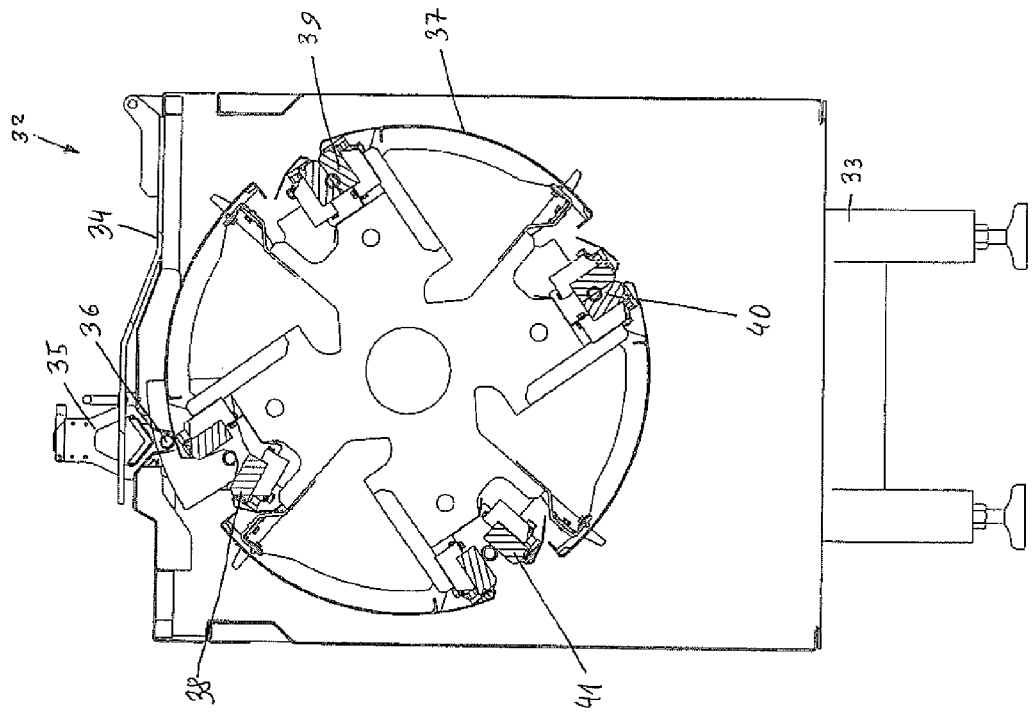
Figure 3:
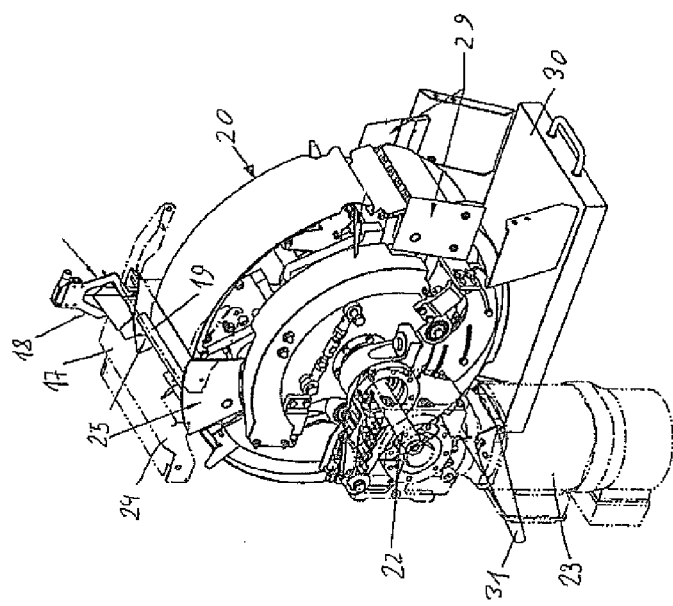
Figure 5:
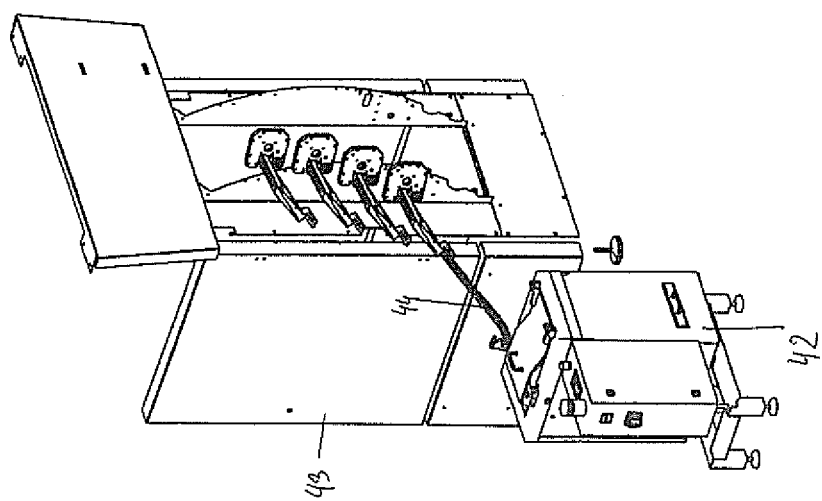

In the drawings:

FIG. 1 shows, in an oblique view, a device according to the invention with only one revolving crimping device configured as mechanically actuatable tongs, FIG. 2 shows, in a side view, a device according to the invention with three revolving crimping devices configured as mechanically actuatable tongs, FIG. 3 shows an oblique view of the device from FIG. 2, FIG. 4 shows a device according to the invention with four revolving crimping devices configured as mechanically actuatable tongs, and FIG. 5 shows, in an oblique view, a device according to the invention next to the baking device which produces the wafer tubes.

DESCRIPTION OF THE INVENTION

FIG. 1 shows a first embodiment of a device for producing pillow-shaped hollow bodies.

FIG. 1 shows a crimping device 1 configured as mechanically actuatable tongs in a horizontally disposed rotatable mounting 2. The tongs 1 are located close to the outer circumference 3 of the rotatable mounting 2. The tongs 1 have a jaw which is located close to the outer circumference 3 of the rotatable mounting 2. The tongs 1 are opened. A wafer tube 4 is located in the jaw. The tongs 1 have two mutually opposite tong cheeks 5 and 6. The right-hand tong cheek 5 in FIG. 1 is rigidly connected to the rotatable mounting 2. The left-hand tong cheek 6 in FIG. 1 is fastened to an actuating lever 8 mounted pivotably in the rotatable mounting 2 at 7. The actuating lever 8 has a free end 8a on which a control roller 9 is mounted. The control roller 9 abuts against a cam 10 of a cam controller. The cam 10 is located stationarily in the frame of the device not shown in FIG. 1. The cam 10 is disposed coaxially to the drive shaft 11 of the rotatable mounting 2. The tong cheeks 5 and 6 each carry a tool strip 12 and 13 arranged parallel to the axis of rotation of the rotatable mounting. In both tools strips 12, 13 crimping jaws 14 are provided adjacent to one another at a distance. The crimping jaws 14 of the two tool strips 12, 13 lie opposite to one another.

When the rotatable mounting 2 in FIG. 1 turns to the right, the control roller 9 of the actuating lever 8 runs along the stationarily disposed cam 10 of the cam controller. The actuating lever 8 is pivoted upwards in FIG. 1, the tong cheek 6 fastened to the actuating lever 8 is moved towards the tong cheek 5 fastened to the rotatable mounting 2 and the tongs are closed.

FIGS. 2 and 3 show a second embodiment of a device for producing pillow-shaped hollow bodies.

The device 15 has a frame 16. A feeding device 18 for the wafer tubes 19 is disposed on the upper side 17 of the frame 16. A horizontally disposed rotatable mounting 20 with a horizontal axis of rotation 21 is provided in the frame 16. The rotatable mounting 20 is mechanically coupled to a drive motor 23 via a drive shaft 22.

A cover plate 24 is disposed on the upper side 17 of the frame 16. An insertion slot for the wafer tubes 19 is disposed in the cover plate 24. The insertion slot is disposed parallel to the axis of rotation 21 of the rotatable mounting 20. Vertical guide plates 25 are disposed at the lateral ends of the insertion slot. The guide plates 25 are fastened to the frame 16. The guide plates 25 form a centering device for the wafer tubes 19 fed horizontally to the device 15.

The rotatable mounting 20 contains three crimping devices 26, 27, 28 configured as mechanically actuatable tongs, which are arranged in a star shape. The jaws of the crimping devices 26, 27, 28 are each disposed near the circumference of the rotatable mounting 20. The rotating rotatable mounting 20 conveys the tongs of the crimping devices 26, 27, 28 along a circular orbit from an upper receiving position of the tongs disposed near the upper side 17 of the frame 16 to a lower delivery position of the tongs disposed on the underside of the rotatable mounting 20.

At the right edge of the frame 16 in FIGS. 2 and 3 strippers 29 attached to the frame 16 are provided. The strippers 29 are assigned to the side surfaces of the tongs of the crimping devices 26, 27, 28. The strippers 29 strip the ends of the wafer tubes projecting laterally beyond the closed tongs of the crimping devices 26, 27, 28 during the rotary movements of the rotatable mounting 20 from the side surfaces of the tongs.

A horizontally disposed collecting tray 30 for the waste falling out from the revolving crimping devices 26, 27, 28 is provided below the rotatable mounting 20. The collecting tray 30 is disposed displaceably in the frame 16.

At the left edge of the frame 16 in FIGS. 2 and 3 a diagonally sloping chute 31 is fastened to the frame 16 below the lower delivery position of the tongs. The pillow-shaped hollow bodies falling out downwards from the tongs of the revolving crimping devices 26, 27, 28 at the lower delivery position of the tongs fall onto the chute 31 and slide on the chute 31 from the device 15.

FIG. 4 shows another embodiment of a device for producing pillow-shaped hollow bodies.

The device 32 has a frame 33. A feeding device 35 for the wafer tubes 36 is disposed on the upper side 34 of the frame 33. A horizontally disposed rotatable mounting 37 is provided in the frame 33, which has a horizontal axis of rotation and contains four crimping devices 38, 39, 40, 41 configured as mechanically actuatable tongs, which are disposed at a distance from one another along the circumference of the rotatable mounting 37. The rotating rotatable mounting 37 conveys the tongs of the crimping devices 38, 39, 40, 41 along a circular orbit from the upper receiving position of the tongs located near the upper side 34 of the frame 33 to a lower delivery position of the tongs which is located on the underside of the rotatable mounting 37.

FIG. 5 shows a device 42 for producing pillow-shaped hollow bodies. The device 42 is disposed next to a baking device 43 in which the wafer tubes are produced. The wafer tubes produced in the baking device 43 slide along a diagonally sloping chute 44 to the device 42 in which one wafer tube after the other is separated into pillow-shaped hollow bodies.

The invention claimed is:

1. An apparatus for producing pillow-shaped hollow bodies that are formed by separating from hot wafer tubes that are plastically deformable in a warm-baked state and are delimited at mutually opposite ends by crimped edges, the apparatus comprising:

a frame bearing a feeding device for feeding in the wafer tubes;

at least one crimping device for separating the wafer tubes into pillow-shaped hollow bodies, said at least one crimping device being disposed to revolve along a circular orbit in said frame between an upper receiving position and a lower delivery position;

said at least one crimping device receiving a wafer tube in the upper receiving position and separating the wafer tube along a path to the lower delivery position into pillow-shaped hollow bodies, which are dispensed from said at least one crimping device in the lower delivery position;

a horizontally disposed rotatable mounting disposed below said feeding device, said mounting being rotatable about a horizontal axis of rotation and containing said at least one crimping device; and said at least one crimping device being configured as mechanically actuatable tongs having a jaw adjacent a periphery of said rotatable mounting and a mechanical actuating device configured to actuate said tongs.

2. The apparatus according to claim 1, which comprises a centering device for centering the wafer tubes fed horizontally to the device, said centering device being attached to said frame in a region of the upper receiving position.

3. The apparatus according to claim 1, which comprises strippers assigned to side surfaces of said revolving crimping device and attached to said frame, said strippers being disposed along the circular orbit between the upper receiving position and the lower delivery position.

4. The apparatus according to claim 1, which comprises a collecting tray disposed to collect waste falling out from said revolving crimping device in said frame below the rotatable mounting.

5. The apparatus according to claim 1, which comprises a diagonally sloping chute fastened to said frame below the lower delivery position for guiding the pillow-shaped hollow bodies falling from said revolving crimping device at the lower delivery position.

6. The apparatus according to claim 1, wherein, in the horizontally disposed rotatable mounting, two or more crimping devices configured as mechanically actuatable tongs, are arranged at a distance from one another along the circumference of said rotatable mounting.

7. The apparatus according to claim 1, wherein said crimping device formed as mechanically actuatable tongs has two cheeks delimiting the jaw, one of said two cheeks is rigidly connected to said rotatable mounting while another of the two cheeks is fastened to an actuating lever mounted pivotably in said rotatable mounting, and which can be brought into engagement with said mechanical actuating device for opening and closing the tongs.

8. The apparatus according to claim 7, wherein said two cheeks have mutually opposite tool strips arranged parallel to the axis of rotation of said rotatable mounting, and said tool strips carry mutually opposite crimping jaws disposed adjacent at a distance to one another.

9. The apparatus according to claim 1, which comprises a drive motor coupled mechanically to said rotatable mounting, and wherein said mechanical actuating device is a cam controller for said tongs of said crimping device, wherein said cam controller includes a stationary cam disposed next to said rotatable mounting and a control roller attached to said actuating lever of said tongs abutting said stationary cam.

* * * * *